(12) United States Patent
Zhang

(10) Patent No.: US 11,842,542 B2
(45) Date of Patent: Dec. 12, 2023

(54) SYSTEM AND METHOD FOR ABNORMAL SCENE DETECTION

(71) Applicant: SHANGHAI TRUTHVISION INFORMATION TECHNOLOGY CO., LTD., Shanghai (CN)

(72) Inventor: Zhong Zhang, Great Falls, VA (US)

(73) Assignee: SHANGHAI TRUTHVISION INFORMATION TECHNOLOGY CO., LTD., Shanghai (CN)

( * ) Notice: Subject to any disclaimer, the term of this patent is extended or adjusted under 35 U.S.C. 154(b) by 92 days.

(21) Appl. No.: 17/039,737

(22) Filed: Sep. 30, 2020

(65) Prior Publication Data

US 2021/0019533 A1    Jan. 21, 2021

Related U.S. Application Data

(63) Continuation of application No. PCT/CN2019/082474, filed on Apr. 12, 2019.

(60) Provisional application No. 62/657,033, filed on Apr. 13, 2018.

(51) Int. Cl.
*G06V 20/52* (2022.01)
*G06T 7/246* (2017.01)
*G06V 20/10* (2022.01)
*G06V 20/40* (2022.01)

(52) U.S. Cl.
CPC ............. *G06V 20/52* (2022.01); *G06T 7/248* (2017.01); *G06V 20/10* (2022.01); *G06V 20/41* (2022.01); *G06V 20/44* (2022.01)

(58) Field of Classification Search
CPC ........ G06V 20/52; G06V 20/41; G06V 20/10; G06V 20/44; G06T 7/248
See application file for complete search history.

(56) References Cited

U.S. PATENT DOCUMENTS

| 7,558,404 | B2 | 7/2009 | Ma et al. | |
| 11,043,097 | B1* | 6/2021 | Edwards | G08B 21/0423 |
| 2005/0258943 | A1* | 11/2005 | Mian | B64D 45/0053 |
| | | | | 340/426.1 |

(Continued)

FOREIGN PATENT DOCUMENTS

| CN | 102098492 A | 6/2011 |
| CN | 102750709 A | 10/2012 |

(Continued)

OTHER PUBLICATIONS

International Search Report in PCT/CN2019/082474 dated Jul. 10, 2019, 4 pages.

(Continued)

*Primary Examiner* — Kenny A Cese
(74) *Attorney, Agent, or Firm* — METIS IP LLC

(57) ABSTRACT

A method for detecting abnormal scene may include obtaining data relating to a video scene, identify at least two motion objects in the video scene based on the data and determining a first motion feature relating to the at least two motion objects based on the data. The method may also include determining a second motion feature relating to at least one portion of each of the at least two motion objects based on the data. The method may further include determining whether the at least two motion objects are involved in a fight based on the first motion feature and the second motion feature.

19 Claims, 9 Drawing Sheets

(56) References Cited

U.S. PATENT DOCUMENTS

| | | | |
|---|---|---|---|
| 2007/0121999 A1* | 5/2007 | Ma | G06T 7/254 |
| | | | 382/103 |
| 2012/0127306 A1* | 5/2012 | Oh | G06V 40/10 |
| | | | 348/143 |
| 2013/0164722 A1* | 6/2013 | Yoshimitsu | G06V 20/52 |
| | | | 434/236 |
| 2013/0170557 A1 | 7/2013 | Wang et al. | |
| 2014/0055610 A1* | 2/2014 | Ko | G06T 7/194 |
| | | | 348/143 |
| 2016/0351031 A1* | 12/2016 | Jo | G08B 13/19615 |
| 2019/0294881 A1* | 9/2019 | Polak | G06V 10/454 |

FOREIGN PATENT DOCUMENTS

| | | |
|---|---|---|
| CN | 103150738 A | 6/2013 |
| CN | 103198296 A | 7/2013 |
| CN | 104516295 A | 4/2015 |
| CN | 105785411 A | 7/2016 |
| CN | 106845325 A | 6/2017 |
| CN | 106910152 A | 6/2017 |
| EP | 2081163 A1 | 7/2009 |
| JP | 2015138427 A | 7/2015 |

OTHER PUBLICATIONS

Written Opinion in PCT/CN2019/082474 dated Jul. 10, 2019, 4 pages.

Datta A. et al., Person-on-Person Violence Detection in Video Data, Object recognition supported by user interaction for service robots, 2002, 6 pages.

Ankur Datta et al., Person-on-Person Violence Detection In Video Data, IEEE Xplore, 2002, 6 pages.

* cited by examiner

700

800

SYSTEM AND METHOD FOR ABNORMAL SCENE DETECTION

CROSS-REFERENCE TO RELATED APPLICATIONS

This application is a continuation of International Application No. PCT/CN2019/082474, filed on Apr. 12, 2019, which claims priority of U.S. Provisional Application No. 62/657,033, filed on Apr. 13, 2018, the contents of each of which are hereby incorporated by reference.

TECHNICAL FIELD

The present disclosure generally relates to surveillance systems, and more specifically relates to methods and systems for detecting abnormal scene in a video.

BACKGROUND

Video surveillance systems are widely used in a variety of applications to detect and monitor objects within an environment. For example, in security applications, such systems are employed to detect and track individuals or vehicles entering or leaving a building facility or a security gate, or to monitor individuals within a store, office building, hospital, or other such setting where the health and/or safety of the occupants may be of concern. A further example is the aviation industry, where such systems have been used to detect the presence of individuals at key locations within an airport such as at a security gate or in a parking garage. In recent years, video surveillance systems may be used to automatically monitoring human behavior. However, current technology does not provide the ability to determine and/or interpret the intent or actions of people in a video scene (e.g., whether two or more persons in a video sequence are involved in a fight, engaged in a conversation, or involved in some other activity). It is desirable to provide systems and methods for detecting abnormal scene based on a video surveillance.

SUMMARY

According to an aspect of the present disclosure, a system for detecting abnormal scene may include a storage device storing a set of instructions and one or more processors in communication with the storage device. When executing the instructions, one or more processors may be configured to cause the system to obtain data relating to a video scene and identify at least two motion objects in the video scene based on the data. The one or more processors may also determine a first motion feature relating to the at least two motion objects based on the data and determine a second motion feature relating to at least one portion of each of the at least two motion objects based on the data. The one or more processors may further determine whether the at least two motion objects are involved in a fight based on the first motion feature and the second motion feature.

In some embodiments, the at least one processor may be further directed to track movements of the at least two motion objects in the video scene.

In some embodiments, to track movements of the at least two motion objects in the video scene, the at least one processor may be further directed to track an entire body movement of each of the at least two motion objects in the video scene and track the movement of at least one portion of each of the at least two motion objects in the video scene.

In some embodiments, the first motion feature relating to the at least two motion objects may include at least one of movement trails of the at least two motion objects, motion intensities of the at least two motion objects, or motion consistencies of the at least two motion objects.

In some embodiments, the second motion feature relating to at least one portion of each of the at least two motion objects may include at least one of a movement trail of the at least one portion of each of the at least two motion objects, a motion consistency of the at least one portion of each of the at least two motion objects, or a motion velocity of the at least one portion of each of the at least two motion objects.

In some embodiments, the at least one processor may be further directed to identify at least one surrounding object in the video scene, determine a third motion feature relating to the at least one surrounding object in the video scene, and determine whether the at least two motion objects are involved in the fight based on the first motion feature, the second motion feature, and the third motion feature.

In some embodiments, to determine whether the at least two motion objects are involved in a fight based on the first motion feature and the second motion feature, the at least one processor may further directed to compare the first motion feature with a first criterion, compare the second motion feature with a second criterion, and determine whether the at least two motion objects are involved in the fight based on the comparison of the first motion feature with the first criterion and the comparison of the second motion feature with the second criterion.

In some embodiments, the at least one processor may be further directed to determine whether the at least two motion objects are involved in a fight based on at least one of physiological signals relating to the at least two motion objects or voice signals from the video scene.

According to an aspect of the present disclosure, a method for detecting abnormal scene is provided. The method may include obtaining data relating to a video scene, identifying at least two motion objects in the video scene based on the data, determining a first motion feature relating to the at least two motion objects based on the data, determining a second motion feature relating to at least one portion of each of the at least two motion objects based on the data, and determining whether the at least two motion objects are involved in a fight based on the first motion feature and the second motion feature.

According to another aspect of the present disclosure, a non-transitory computer readable medium may include instructions. When executed by at least one processor, the executions may cause the at least one processor to implement a method for detecting abnormal scene. The method may include obtaining data relating to a video scene, identifying at least two motion objects in the video scene based on the data, determining a first motion feature relating to the at least two motion objects based on the data, determining a second motion feature relating to at least one portion of each of the at least two motion objects based on the data, and determining whether the at least two motion objects are involved in a fight based on the first motion feature and the second motion feature.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise.

It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, section or assembly of different level in ascending order. However, the terms may be displaced by other expression if they achieve the same purpose.

Figure 8:
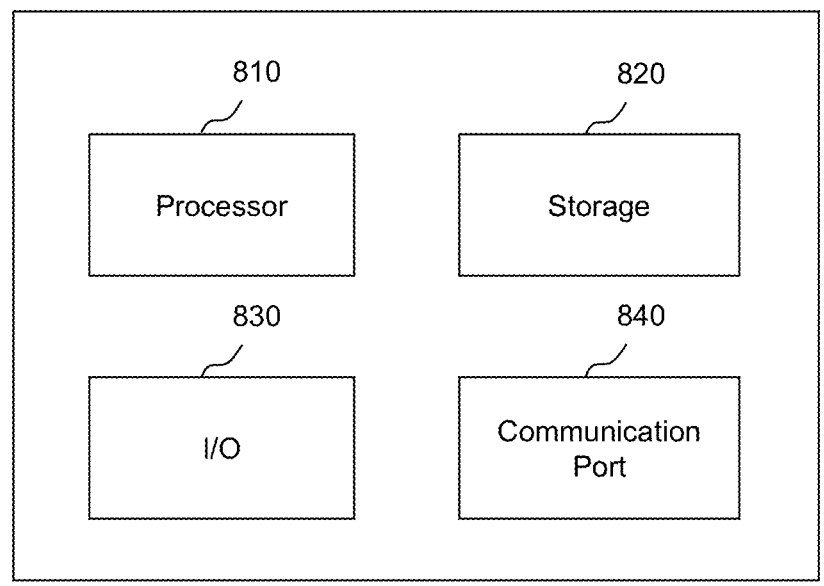
FIG. 8 is a schematic diagram illustrating exemplary hardware and/or software components of an exemplary computing device on which the processing engine may be implemented according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 810 as illustrated in FIG. 8) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

An aspect of the present disclosure relates to a system and method for detecting abnormal scene. The system may obtain data relating to a video scene and identify at least two motion objects in the video scene based on the data relating to the video scene. The system may also determine a first motion feature relating to the at least two motion objects based on the data and determine a second motion feature relating to at least one portion of each of the at least two motion objects based on the data. The system may further determine whether the at least two motion objects are involved in a fight based on the first motion feature and the second motion feature. For illustration purposes, the disclosure describes systems and methods for imaging system. It should be noted that the fighting assessment system 700 described below is merely provided for illustration purposes, and not intended to limit the scope of the present disclosure.

Figure 1:
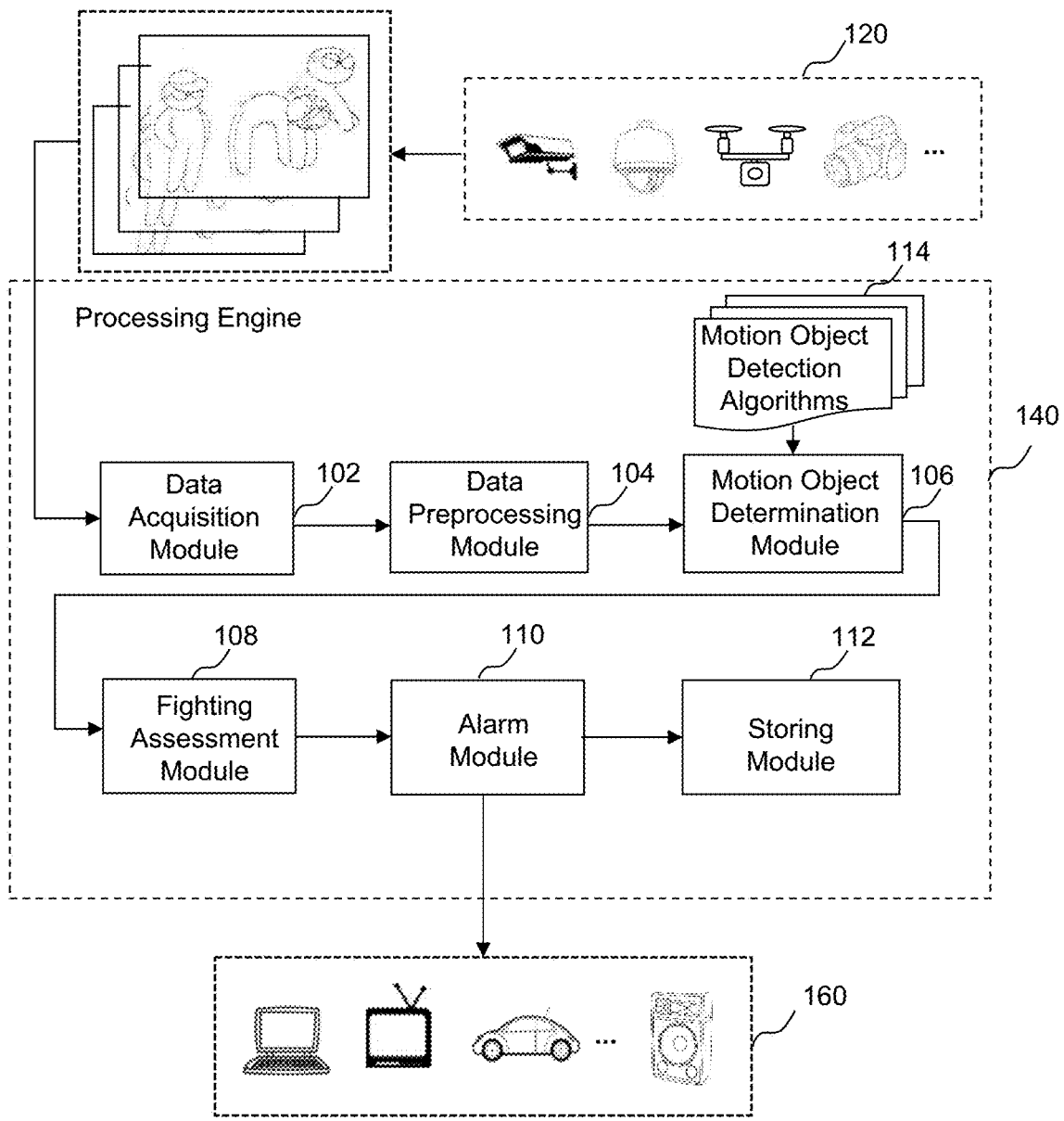
FIG. 1 is a schematic diagram illustrating an exemplary processing engine for processing video data according to some embodiments of the present disclosure.

FIG. 1 is a schematic diagram illustrating an exemplary processing engine 140 for processing video data according to some embodiments of the present disclosure. As shown, the processing engine 140 may include a data acquisition module 102, a data processing module 104, a motion object determination module 106, a fighting assessment module 108, an alarm module 110, and a storing module 112. In some embodiments, the data acquisition module 102, the data processing module 104, the motion object determination module 106, the fighting assessment module 108, the alarm module 110, and the storing module 112 may be connected to and/or communicate with each other via a wireless connection (e.g., a network), a wired connection, or a combination thereof.

The data acquisition module 102 may acquire data relating to a video scene. In some embodiments, the data relating to a video scene may include a video. As used herein, the term "video" may refer to motion pictures represented in analog and/or digital form. For examples, a video may include television, movies, image sequences from a camera or other observer, computer-generated image sequences, or the like, or a combination thereof. As used herein, a sequence (also referred to as a frame) may refer to a particular image or other discrete unit within a video. In some embodiments, the video may be obtained from, for example, a live feed, a storage device, an IEEE 1394-based interface, a video digitizer, a computer graphics engine, a network connection, or the like, or a combination thereof. For example, the data acquisition module 102 may obtain the data relating to a video scene from a monitoring device 120. In some embodiments, the monitoring device 120 may include a video camera. As used herein, a video camera may refer to an apparatus for visual recording. For example, the video camera may include a color camera, a digital video camera, a camera, a camcorder, a PC camera, a webcam, an infrared (IR) video camera, a low-light video camera, a thermal video camera, a CCTV camera, a pan, a tilt, a zoom (PTZ) camera, a video sensing device, or the like, or a combination thereof.

The monitoring device 120 may be positioned to perform surveillance of an area of interest (AOI). The AOI may be reflected in the video as the video scene. In some embodiments, the video scene may include one or more objects of interest. The one or more objects of interest may include a person, a vehicle, an animal, a physical subject, or the like, or a combination thereof. One or more actions of the one or more of objects of interest may be reflected in the video scene. In some embodiments, the actions of the one or more objects of interest may include performing a movement, making a sound, making a response, or the like, or a combination thereof. In some embodiments, one or more actions and/or one or more composites of the actions of one or more motion objects may be also referred to as an activity. An event may refer to a fact that one or more objects are engaged in an activity. The event may be defined by a location and/or a time. In some embodiments, the event relating to the one or more objects may include a normal event and an abnormal event. The normal event may refer to an event performed by the one or more objects that may not cause a damage to one of the objects or other subjects. The abnormal event may refer to an event performed by the one or more objects that may cause a damage to one of the objects or other subjects. For example, the abnormal event may include fighting, quarreling, robbing, gathering, collision, etc. The normal event may include dancing, greeting (e.g., handshake), exercise (e.g., running), playing a game, etc.

In some embodiments, the data acquisition module 102 may transfer the data relating to a video scene to other modules of the processing engine 140 for further processing. For example, the data acquisition module 102 may transfer the data relating to a video scene to the data preprocessing module 104 for preprocessing the data. As another example, the data acquisition module 102 may transfer the image data relating to a video scene to the motion object determination algorithms 114 for determining a motion object from the video scene. As still an example, the data acquisition module 102 may transfer the data relating to a video scene to the storing module 112 for store in a local database or a remote database.

The data preprocessing module 104 may preprocess the data relating to a video scene. In some embodiments, the preprocessing for the data relating to a video scene may include an enhancement operation, a transform operation, a compress operation, an edge detection, a segmentation operation, a nose reduction operation, or the like, or a combination thereof. For example, the transform operation may be perform to transform the data relating to a video scene in a domain (e.g., a spatial domain) to another domain (e.g., a frequency domain) for determining a feature of a motion object in the video scene. As another example, the enhancement operation may be performed to enhance a portion (e.g., a subject portion) of the video scene. As still another example, the segmentation operation may be performed to identify or classify a motion object in the video scene. In some embodiments, the data preprocessing module 104 may transfer the preprocessed data relating to a video scene to other modules of the processing engine 140 for further processing. For example, the data preprocessing module 104 may transfer the preprocessed data relating to a video scene to the motion object determination module 106 for determining one or more motion objects in the video scene.

The motion object determination module 106 may determine one or more motion objects in the video scene. In some embodiments, the video scene may include a subject portion and a background portion. The subject portion may include one or more motion objects of interest. For example, if the video scene relates to an indoor environment (e.g., a room), the subject portion may include one or more persons, one or more animals, (e.g., a dog), etc., and the background portion may include one or more walls/windows, one or more furniture (e.g., a desk, a bed, etc.), one or more potting, etc. As another example, if the video scene relates to an outdoor environment (e.g., a street, a park, etc.), the subject portion may include one or more vehicles, one or more pedestrians, etc., and the background portion may include one or more plants, one or more constructions, one or more communal facilities, rain, snow, swaying branches of a tree, etc.

In some embodiments, the motion object determination module 106 may identify the subject portion (e.g., one or more motion objects) and/or filter the background portion from the video scene based on one or more motion object detection algorithms 114. Exemplary motion object detection algorithms may include an inter-frame difference algorithm, a background difference algorithm, an optical flow algorithm, or the like, or a combination thereof. For example, the background difference algorithm may include a temporal difference algorithm, an average filtering algorithm, a W4 algorithm, a Gaussian mixture model algorithm, etc.

In some embodiments, the motion object determination module 106 may track the one or more motion objects in the video scene. The motion object determination module 106 may track the one or more motion objects in the video scene (e.g., continuous image frames) via estimating a motion state of the motion objects based on the data relating to video scene. In some embodiments, tracking of motion objects may be performed by determining a match relationship of one or more features of motion objects reflected in the video scene (e.g., continuous image frames or sequences). The features of motion objects may include a static feature and a dynamic feature. The static feature of motion objects may refer to a feature of a motion object unrelated to movements of motion objects. For example, the static feature of motion objects reflected in the video scene (e.g., continuous image sequences or frames) may include shape (e.g., a height, a width, a ratio of height to width, etc.), color, texture, or the like, or a combination thereof. The dynamic feature of motion objects reflected in the video scene (e.g., continuous image sequences or frames) may relate to movements of motion objects. For example, the dynamic feature of motion objects may include a movement trail, a movement velocity, a movement displacement, a movement direction, a movement acceleration, or the like, or a combination thereof.

In some embodiments, the motion object determination module 106 may classify the one or more identified or tracked motion objects to determine one or more motion targets. For example, the identified or tracked motion objects may be classified into organism and non-organism. As another example, the identified or tracked motion objects may be classified into persons and animals. In some embodiments, the identified or tracked motion objects may be classified based on one or more one or more features of the identified or tracked motion objects (e.g., static features and/or or dynamic features). For example, the identified or tracked motion objects may include a persons and a vehicle. The motion object determination module 106 may classify the person and the vehicle based on shapes of the person and vehicle.

In some embodiments, the motion object determination 106 may transfer data relating to the determined motion object to other modules of the processing engine 140 for further processing. For example, the motion object determination 106 may transfer the features relating to the motion targets to the fighting assessment module 108 for determining whether the at least two motion objects are involved in a fight. As anther example, the motion object determination 106 may transfer the features relating to the motion targets to the storing module 112 for store. More descriptions for the motion object determination 106 may be found in FIG. 3.

The fighting assessment module 108 may determine whether at least two motion targets are involved in a fight. In some embodiments, the at least two motion targets may be determined by the motion object determination module 106. In some embodiments, the fighting assessment module 108 may determine whether the at least two motion targets are involved in a fight based on dynamic features (also referred to as motion features) relating the at least two motion targets. In some embodiments, the dynamic features may include a first motion feature, a second motion feature, a third motion feature, etc. As used herein, the first motion feature (also referred to as global motion feature) relating to at least two motion targets may refer to motion features relating to an entire body of each of the at least two motion targets and/or a relationship between motion features relating to entire bodies of the at least two motion targets. For example, the first motion feature relating to at least two motion targets may include a movement trail of each entire body of the at least two motion targets, a motion intensity of each entire body of the at least two motion targets, a motion consistency of entire bodies of the at least two motion targets, or the like, or a combination thereof. The second motion feature (also referred to as local motion feature) relating to each of the at least portion of the at least two motion targets may refer to motion features relating to a local portion of the each of the at least two motion targets. For example, the second motion feature may include a movement trail of a portion of each of the at least two motion targets, a motion consistency of the portion of each of the at least two motion targets, a motion velocity of the portion of each of the at least two motion targets, a motion displacement of the portion of each of the at least two motion targets, a motion direction of the portion of each of the at least two motion targets, or the like, or a combination thereof. The third motion feature (also referred to as surrounding motion feature) may relate to the movement of one or more objects surround the at least two motion targets. The More descriptions of the motion features may be found in FIG. 5 and FIG. 6.

Further, the fighting assessment module 108 may compare the first movement feature with a first criterion and/or the second motion feature with a second criterion. Then, the fighting assessment module 108 may determine whether the at least two motion objects are involved in a fight based on the comparison between the first motion feature and the first criterion and the comparison between the second motion feature and the second criterion. More descriptions for the fighting assessment module 108 may be found in FIG. 5.

In some embodiments, the fighting assessment module 108 may be connected to and/or communicate with other modules of the processing engine 140. For example, the fighting assessment module 108 may transfer a fighting assessment result to the alarm module 110 for generating an alarm signal relating to a fight between the at least two motion targets. As another example, the fighting assessment module 108 may transfer the fighting assessment result to the storing module 112 for store in a local database or a remote database.

The alarm module 110 may generate an alarm signal relating to a fight between the at least two motion targets. The alarm signal relating to a fight may be in a form of sound, text, image, video, or the like, or a combination thereof. In some embodiments, the alarm module 110 may be connected to and/or communicate with one or more terminals 160 to provide the information related to the alarm signal to a user. In some embodiments, the information related to the alarm signal may be displayed on the user interfaces of the one or more terminals 160 in at least one of sound, text, image, video, or a combination thereof. In some embodiments, the information related to the alarm signal may be displayed on the user interfaces of the terminals 160 in one or more view windows, among which, one view window may display a panoramic scene in one resolution and at least one other view window may display a partial scene focused on the at least two motion targets in a different resolution. The terminals 160 may include a mobile device, a tablet computer, . . . , a laptop computer, or the like, or any combination thereof. For example, the mobile device may include a mobile phone, a personal digital assistant (PDA), a gaming device, a navigation device, a point of sale (POS) device, a laptop, a tablet computer, or the like, or any combination thereof. In some embodiments, the terminals 160 may include an input device, an output device, etc. The input device may include alphanumeric and other keys that may be input via a keyboard, a touch screen (for example, with haptics or tactile feedback), a speech input, an eye tracking input, a brain monitoring system, or any other comparable input mechanism. The input information received through the input device may be transmitted to the processing device 140 via, for example, for further processing. Other types of the input device may include a cursor control device, such as a mouse, a trackball, or cursor direction keys, etc. The output device may include a display, a speaker, a printer, or the like, or any combination thereof. In some embodiments, the alarm module 110 may be connected to and/or communicate with the monitoring device 120. For example, the monitoring device 120 may receive an alarm signal relating to a fight between the at least two motion targets from the alarm module 110. As another example, the monitoring device 120 may generate an intervening signal (e.g., a warning, a shock, etc.) to the at least two motion targets in response to the alarm signal relating to a fight between the at least two motion targets.

The storing module 112 may store data, instructions, and/or any other information relating to an assessment of a fight based on data relating to a video scene. In some embodiments, the storing module 112 may store data obtained from the processing engine 140, the terminals 160, and/or the monitoring device 120. In some embodiments, the storing module 112 may store data and/or instructions that the processing engine 140 may execute or use to perform exemplary methods described in the present disclosure. In some embodiments, the storing module 112 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storing module 112 may be implemented on a cloud platform as described elsewhere in the disclosure. In some embodiments, the storing module 112 may be connected to and/or to communicate with one or more other components in the processing engine 140. One or more components in the processing engine 140 may access the data or instructions stored in the storing module 112.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure. For example, the monitoring device 120 may include one or more physiological signal measuring devices, such as an oscillometric device, a portable electrocardiograph (ECG) monitor, a portable photoplethysmographic (PPG) monitor, or the like, or a combination thereof. As another example, the features relating to motion objects may further include physiological signal features.

Figure 2:
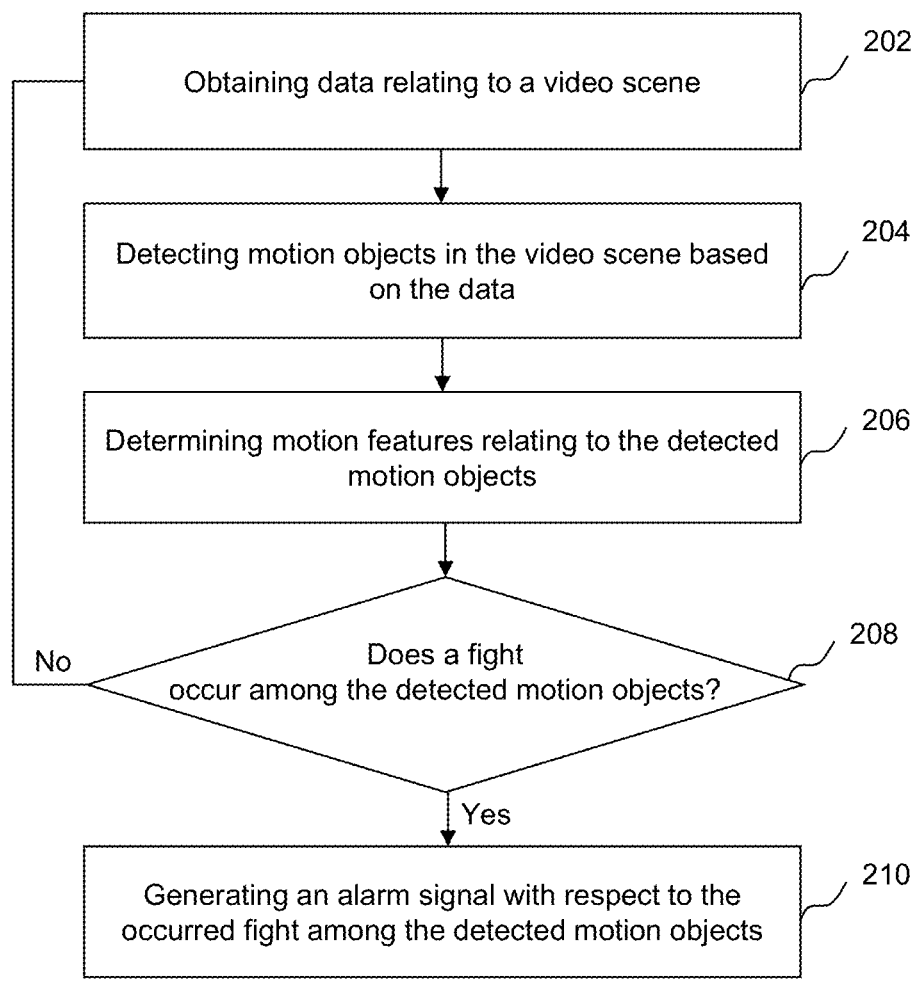
FIG. 2 is a flowchart illustrating an exemplary process for processing video data according to some embodiments of the present disclosure.
Figure 9:
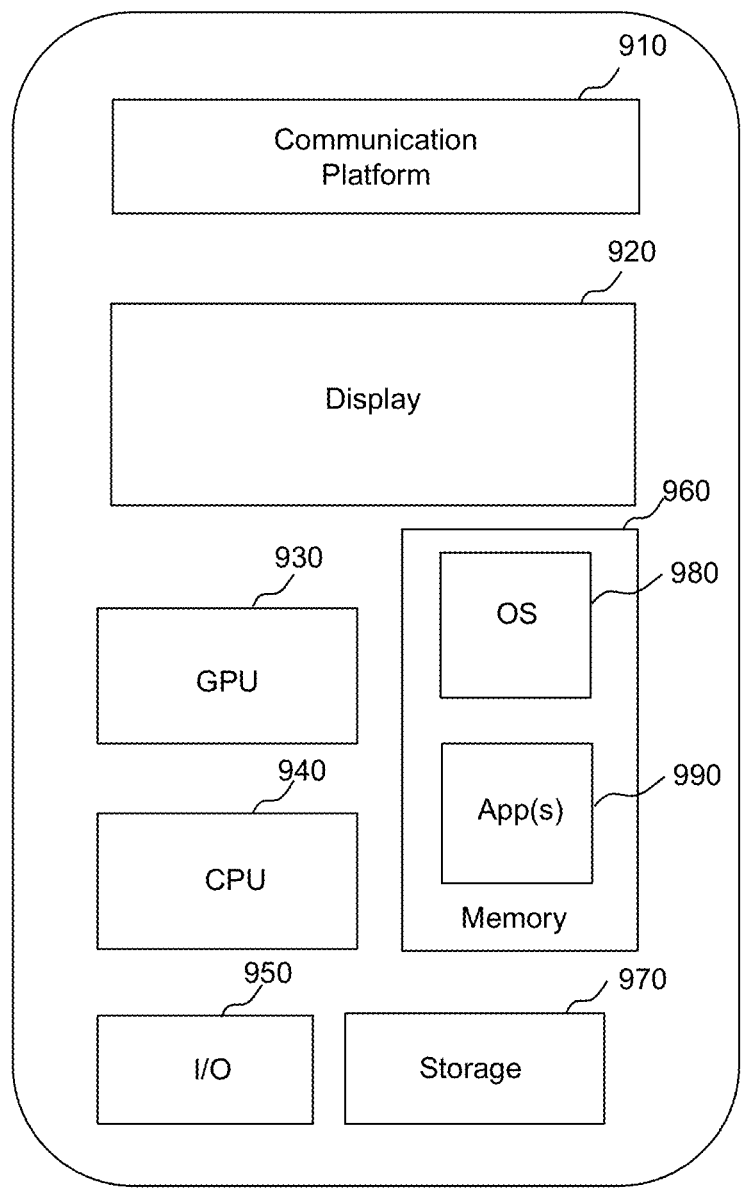
FIG. 9 is a schematic diagram illustrating exemplary hardware and/or software components of an exemplary mobile device on which the terminal(s) may be implemented according to some embodiments of the present disclosure.

FIG. 2 is a flowchart illustrating an exemplary process 200 for processing video data according to some embodiments of the present disclosure. In some embodiments, one or more operations of process 200 illustrated in FIG. 2 may be implemented in the fighting assessment system 700 illustrated in FIG. 7. For example, the process 200 illustrated in FIG. 2 may be stored in the storage 780 in the form of instructions, and invoked and/or executed by the processing device 740 (e.g., the processor 810 of the computing device 800 as illustrated in FIG. 8, the GPU 930 or CPU 940 of the mobile device 900 as illustrated in FIG. 9).

In 202, data relating to a video scene may be obtained. Operation 202 may be performed by the data acquisition module 102. In some embodiments, the data relating to a video scene may include a video as described elsewhere in the present disclosure (e.g., FIG. 1 and the descriptions thereof). In some embodiments, the data relating to a video scene may be obtained from the monitoring device 720, the storage device 780, the terminals 760, or any other external storage device.

In 204, motion objects may be detected in the video scene. Operation 204 may performed by the motion object determination module 106. In some embodiments, the motion objects may be detected in the video scene based on one or more motion object detection algorithms as described elsewhere in the present disclosure (e.g., FIG. 1 and the descriptions thereof) according to process 400 as described in connection with FIG. 4.

In 206, one or more motion features relating to the detected motion objects may be determined. Operation 206 may be performed by the motion object determination module 106. The motion features relating to the detected motion objects may include a first motion feature relating to an entire body of each of the identified motion objects, a second motion feature relating to a portion of each of the identified motion objects, etc. The portion of each of the detected motion objects may include a hand, an arm, a finger, a thumb, a foot, an elbow, a knee, the head etc. The first motion feature relating to an entire body of each of the identified motion objects may include a movement trail of an entire body of each of the detected motion objects, a motion intensity of an entire body of each of the detected motion objects, a motion consistency of entire bodies of the detected motion objects, or the like, or a combination thereof. The second motion feature relating to a portion of each of the detected motion objects may include a movement trail of a portion of each of the detected motion objects, a motion consistency of the portions of the detected motion objects, a motion velocity of the portion of each of the detected motion objects, a motion displacement of the portion of each of the detected motion objects, a motion direction of the portion of each of the detected motion objects, or the like, or a combination thereof.

In 208, a determination may be made to as whether a fight occurs among the detected motion objects. Operation 206 may be performed by the fighting assessment module 108. If it is determined that the fight occurs among the detected motion objects, process 200 may proceed to perform operation 210. If it is determined that the fight does not occur among the detected motion objects, process 200 may proceed to perform operation 202. In some embodiments, whether the fight occurs among the detected motion objects may be determined based on the motion features relating to the detected motion objects. Further, whether the fight occurs among the detected motion objects may be determined based on the first motion feature relating to an entire body of each of the detected motion objects and/or the second motion feature relating to a portion of each of the detected motion objects. More descriptions for determining whether a fight occurs among the detected motion objects may be found in FIG. 6, and the descriptions thereof.

In 210, an alarm signal with respect to the occurred fight among the detected motion objects may be generated. Operation 210 may be performed by the alarm module 110. The alarm signal with respect to the occurred fight among the detected motion objects may be in a form of sound, text, video, image, or the like, or a combination thereof. In some embodiments, the alarm signal with respect to the occurred fight among the detected motion objects may be transmitted to a device (e.g., the terminals 760, the terminals 160, etc.) associated with a user to provide the information related to the alarm signal to user. In some embodiments, the information related to the alarm signal may be displayed on the user interfaces of the one or more terminals 160 in at least one of sound, text, image, video, or a combination thereof. In some embodiments, the information related to the alarm signal may be displayed on the user interface of the terminals 160 in one or more view windows, among which, one view window may display a panoramic scene in one resolution and at least one other view window may display a partial scene focused on the at least two motion targets in a different resolution. In some embodiments, the alarm signal with respect to the occurred fight among the detected motion objects may be transmitted to a monitoring device (e.g., the monitoring device 720, the monitoring device 120, etc.) associated with the detected motion objects to provide an intervening signal to the detected motion objects or other objects associated with the detected motion objects. The intervening signal for the detected motion objects or other objects associated with the detected d motion objects may be in a form of image, sound, text, shock, or the like, or a combination thereof. For example, the intervening signal for the detected motion objects may include a shock generated by the monitoring device (e.g., a smart wearable device) in response to the alarm signal with respect to the occurred fight among the detected motion objects. As another example, the intervening signal for the detected motion objects may include buzzing generated by the monitoring device including a buzzer in response to the alarm signal with respect to the occurred fight among the detected motion objects.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure. For example, operation 204 may be divided into multiple operations. Further, operation 204 may include identifying the motion objects in the video scene. Operation 204 may further include tracking the identified the motion objects in data relating to the video scene. As another example, operation 206 may be integrated into operation 204. As still an example, process 200 may further include storing intermediate data (e.g., the motion features, the alarm signal, the fight assessment result, etc.) generated during operations 202-210.

Figure 3:
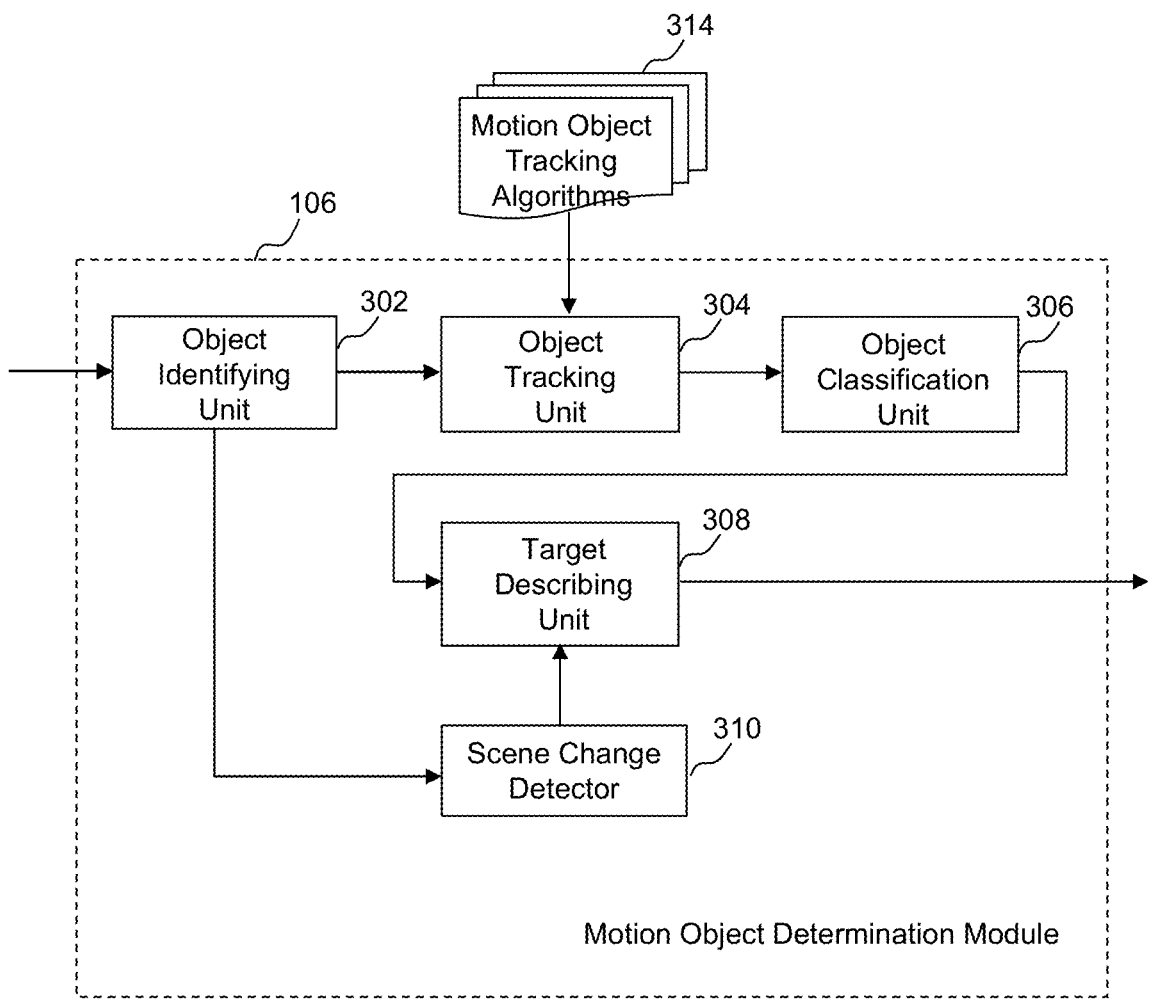
FIG. 3 is a schematic diagram illustrating an exemplary motion object determination module for processing video data according to some embodiments of the present disclosure e.

FIG. 3 is a schematic diagram illustrating an exemplary motion object determination module 106 for processing video data according to some embodiments of the present disclosure. As shown, the motion object determination module 106 may include an object identifying unit 302, an object tracking unit 304, an object classification unit 306, a target describing unit 308, and a scene change detector 310. In some embodiments, the object identifying unit 302, the object tracking unit 304, the object classification unit 306, the target describing unit 308, and the scene change detector 310 may be connected to and/or communicate with each other via a wireless connection (e.g., a network), a wired connection, or a combination thereof.

The object identifying unit 302 may identify motion objects based on data relating to a video scene. The data relating to the video scene may be obtained as described elsewhere in the present disclosure (e.g., FIG. 1 and FIG. 2, and the descriptions thereof). In some embodiments, the data relating to a video scene may include multiple image sequences relating to the video scene. The object identifying unit 302 may detect and/or extract the motion objects from the multiple image sequences based on one or more motion object detection algorithms as described elsewhere in the present disclosure (e.g., FIG. 1, and the descriptions thereof). In some embodiments, the object identifying unit 302 may be connected to and/or communicate with other components of the motion object determination module 106. For example, the object identifying unit 302 may transfer the identified at least two motion objects to the object tracking unit 304 for tracking the at least two motion objects. As another example, the object identifying unit 302 may transfer the identified at least two motion objects to the scene change detector 310 for determining a motion change of the at two motion objects.

The object tracking unit 304 may track movements relating to the identified motion objects identified by the object identifying unit 302. In some embodiments, the object tracking unit 304 may track the movement of an entire body of each of the identified motion objects in the multiple image sequences. For example, the object tracking unit 304 may track the body contour of each of the identified motion objects in the multiple image sequences. As another example, the object tracking unit 304 may track an estimated gravity center of each of the identified motion objects in the multiple image sequences. In some embodiments, the object tracking unit 304 may track the movement of a portion of the each of the identified motion objects in the multiple image sequences. For example, the object tracking unit 304 may track the contour of the portion of each of the identified motion objects in the multiple image sequences. The object tracking unit 304 may determine a match relationship of the at least two motion objects in the multiple image sequences to track movements relating to the at least two motion objects. The object tracking unit 304 may further determine a movement state and/or movement trails of the at least two motion objects and/or at least one portion of each of the at least two motion objects. In some embodiments, the object tracking unit 304 may track movements of the at least two motion objects based on one or more motion object tracking algorithms 314. Exemplary motion object tracking algorithms may include an estimation-based tracking algorithm, a feature-based tracking algorithm, a model-based tracking algorithm, an area-based tracking algorithm, a motion contour-based tracking algorithm, or the like, or a combination thereof. The estimation-based tracking algorithm may include a Kalman filtering algorithm, a particle filtering algorithm, etc. The feature-based tracking algorithm may apply a feature (e.g., shape, texture, color, edge, etc.) of an object to track the object. The area-based tracking algorithm may include a Camshift algorithm, a kernel-based tracking algorithm, a trust-region tracking algorithm, etc. The motion contour-based tracking algorithm may include applying a Snake model, a Hidden Markov model (HMM), etc.

In some embodiments, the object tracking unit 304 may be connected to and/or communicate with other components of the motion object determination module 106. For example, the object tracking unit 304 may transfer the tracked at least two motion objects to the object classification unit 306 for classifying the at least two motion objects. As another example, the object tracking unit 304 may transfer the identified at least two motion objects to the scene change detector 310 for determining a motion change of the at least two motion objects.

The object classification unit 306 may classify the at least two motion objects identified by the object identifying unit 302 or tracked by the object tracking unit 304. In some embodiments, the object classification unit 306 may determine targets from the at least two motion objects identified by the object identifying unit 302 or tracked by the object tracking unit 304. In some embodiments, the identified or tracked at least two motion objects may include at least two motion targets. For example, the at least two motion objects may include at least two persons, one or more motion vehicles, one or more animals, etc. The object classification unit 306 may distinguish the at least two persons from the one or more motion vehicles and the one or more motion animals. In some embodiments, the object classification unit 306 may classify the at least two motion objects based on shape information (e.g., contour, area, height, width, etc.) of the at least two motion objects via a classifier technique. Exemplary classifier techniques may include a decision tree algorithm, a logistic regression algorithm, a naive Bayes algorithm, a neural network algorithm, or the like, or a combination thereof.

In some embodiments, the object classification unit 306 may be connected to and/or communicate with other components of the motion object determination module 106. For example, the object classification unit 306 may transfer the determined targets to the target describing unit 308 for describing the at least two motion objects. As another example, the object classification unit 306 may transfer the determined targets to the scene change detector 310 for determining a motion change of the targets.

The target describing unit 308 may extract features relating to the motion targets and describe features of the motion targets using one or more feature descriptor. Exemplary feature descriptors may include a scale invariant feature transform (SIFT), a speeded up robust feature (SURF), a multi-support region order-based gradient histogram (MROGH), a binary robust independent element feature (BRIEF), an affine SIFT, or the like, or a combination thereof. In some embodiments, the target describing unit 308 may be connected to and/or communicate with other components of the motion object determination module 106.

The scene change detector 310 may determine a change relating to a video scene. In some embodiments, the change relating to the video scene may include a change of a feature relating to a motion object, a signal loss, etc. For example, the change of a feature relating to a motion object may include a change of a dynamic feature, a change of a static feature, etc. In some embodiments, the signal loss relating to the video scene may refer to data loss relating to the video scene. For example, the data relating to the video scene may lose a portion corresponding to a time period. In some embodiments, the scene change detector 310 may be connected to and/or communicate with other components of the motion object determination module 106. For example, the scene change detector 310 may transmitted the change relating to the video scene to the target describing unit 308 for describing the features relating to the motion objects.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure. For example, the target describing unit 308 and the object classification unit 306 may be integrated into one single unit. As another example, the target describing unit 308 and the scene change detector 310 may be integrated into one single unit. As still an example, the object classification unit 306 and/or the scene change detector 310 may be omitted.

Figure 4:
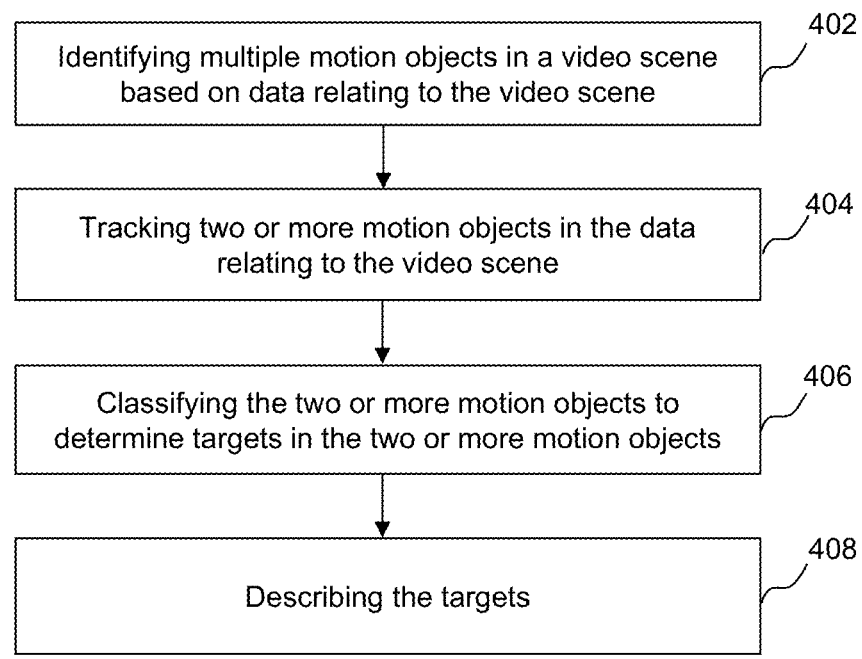
FIG. 4 is a flowchart illustrating an exemplary process for detecting motion objects according to some embodiments of the present disclosure.

FIG. 4 is a flowchart illustrating an exemplary process 400 for detecting motion objects according to some embodiments of the present disclosure. In some embodiments, one or more operations of process 400 illustrated in FIG. 4 may be implemented in the fighting assessment system 700 illustrated in FIG. 7. For example, the process 400 illustrated in FIG. 4 may be stored in the storage 780 in the form of instructions, and invoked and/or executed by the processing device 740 (e.g., the processor 810 of the computing device 800 as illustrated in FIG. 8, the GPU 930 or CPU 940 of the mobile device 900 as illustrated in FIG. 9).

In 402, multiple motion objects in a video scene may be identified based on data relating to the video scene. Operation 402 may be performed by the object identifying unit 302. In some embodiments, the data relating to a video scene may include a video as described elsewhere in the present disclosure (e.g., FIG. 1 and FIG. 2, and the descriptions thereof). The video may include multiple image sequences (also referred to as image frames). The multiple motion objects may be reflected in the at least one portion of the multiple image sequences with specific postures, specific positions, specific shapes, etc. In some embodiments, the data relating to a video scene may be obtained from the monitoring device 720, the storage device 780, the terminals 760, or any other external storage device.

The multiple motion objects may be identified from the multiple image sequences based on one or more motion object detection algorithms as described elsewhere in the present disclosure (e.g., FIG. 1, and the descriptions thereof).

In 404, two or more motion objects may be tracked in the data relating to the video scene. Operation 404 may be performed by the object tracking unit 304. In some embodiments, the object tracking unit 304 may track the movement of an entire body of each of the two or more motion objects in the multiple image sequences. For example, the object tracking unit 304 may track the body contour of each of the two or more motion objects in the multiple image sequences. As another example, the object tracking unit 304 may track an estimated gravity center of each of the two or more motion objects in the multiple image sequences. In some embodiments, the object tracking unit 304 may track the movement of a portion of each of the two or more motion objects in the multiple image sequences. For example, the object tracking unit 304 may track the contour of the portion of each of the two or more motion objects in the multiple image sequences. The portion of each of the two or more motion objects may include a portion of an entire body of each of the two or more motion objects as described elsewhere in the present disclosure. In some embodiments, the object tracking unit 304 may track movements of the at least two motion objects based on one or more motion object tracking algorithms 314. Further, the object tracking unit 304 may perform a blob-based tracking. For example, the object tracking unit 304 may connect moving pixels to form blobs. Then the object tracking unit 304 may track the blobs to track the two or more motion objects. In some embodiments, the two or more motion objects may include a first portion and a second portion. The motion objects in the second portion may surround the motion objects in the first portion. In some embodiments, the motion objects in the second portion may gather to the motion objects in the first portion in the video scene.

In 406, the two or more motion objects may be classified to determine targets in the two or more motion objects. Operation 406 may be performed by the object classification unit 306. In some embodiments, the targets may include human. In some embodiments, the two or more motion objects may be classified based on features of the two or more motion objects (e.g., a static feature (e.g., contour, area, height, width, etc.)) of the two or more motion objects via a classifier technique. Exemplary classifier techniques may include a decision tree algorithm, a logistic regression algorithm, a naive Bayes algorithm, a neural network algorithm, or the like, or a combination thereof.

In 408, the targets may be described. Operation 408 may be performed by the target describing unit 308. In some embodiments, features relating to the targets and/or relationships between the features relating to the targets may be represented by one or more descriptors. Exemplary descriptors may include a geometric feature descriptor, a topological feature descriptor, a region descriptor, a boundary descriptor, a texture descriptor, or the like, or a combination thereof. The features relating to the targets may include a static feature and a dynamic feature as described elsewhere in the present disclosure. In some embodiments, the static feature of the targets may be described by the one or more descriptors.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure. For example, operation 406 may be performed before operation 404. As another example, operations 402 and 406 may be performed simultaneously. As still an example, operation 408 and/or operation 406 may be omitted.

Figure 5:
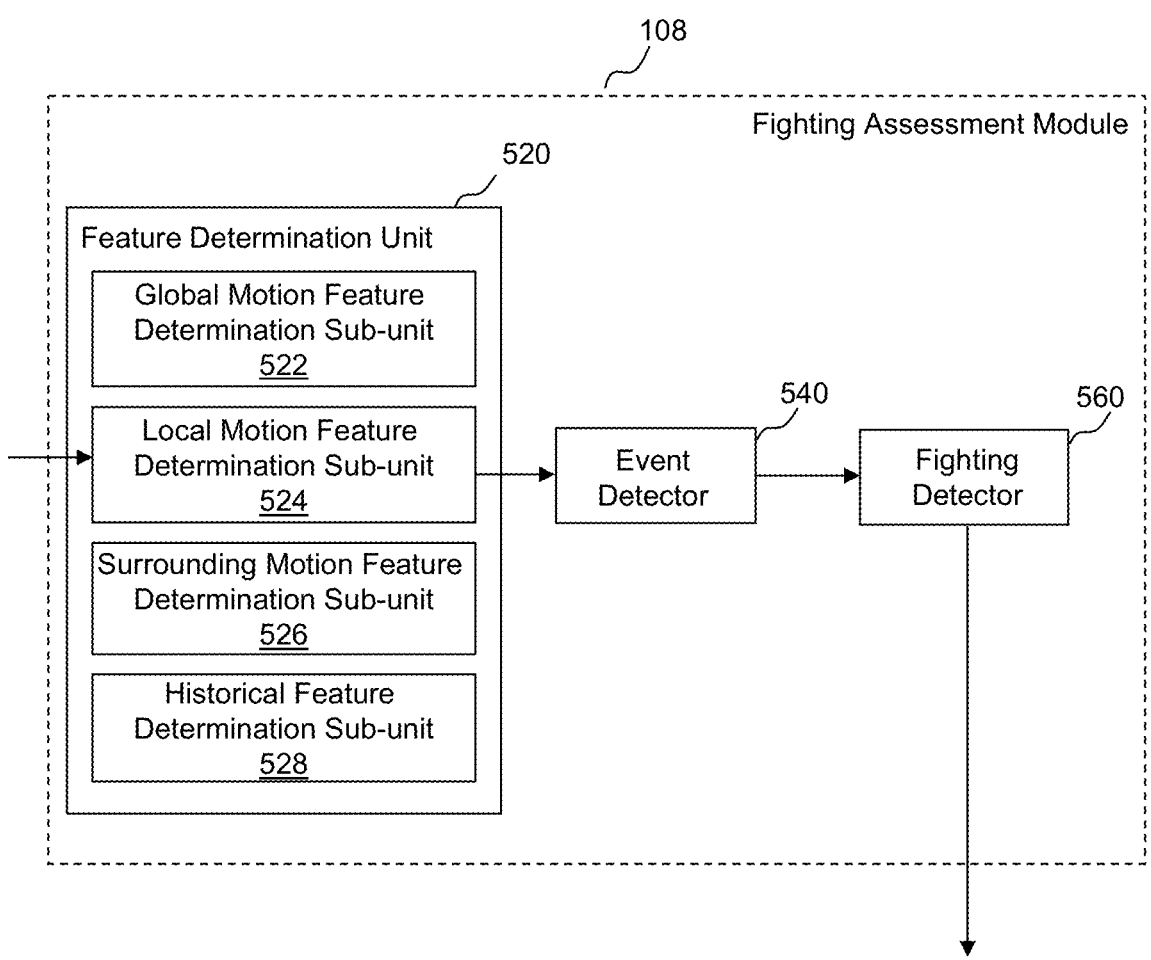
FIG. 5 is a schematic diagram illustrating an exemplary fighting assessment module according to some embodiments of the present disclosure.

FIG. 5 is a schematic diagram illustrating an exemplary fighting assessment module 108 according to some embodiments of the present disclosure. As shown, the fighting assessment module 108 may include a feature determination unit 520, a event detector 540, and a fighting detector 560. In some embodiments, the feature determination unit 520, the event detector 540 and the fighting detector 560 may be connected to and/or communicate with each other via a wireless connection (e.g., a network), a wired connection, or a combination thereof.

The feature determination unit 520 may include a global motion feature determination sub-unit 522, a local motion feature determination sub-unit 524, a surrounding motion feature sub-unit 526, and a historical feature determination sub-unit 528, etc.

The global motion feature determination sub-unit 522 may determine a global motion feature (also referred to as a first motion feature as described in FIG. 1) relating to an entire body of each of motion targets. In some embodiments, the global motion feature relating to an entire body of each of the motion targets may include a movement trail of an entire body of each of the motion targets, a movement intensity of an entire body of each of the motion targets, a movement consistency between the motion targets, etc. The movement trail of an entire body of each of the motion targets may refer to a spatial feature of the movement of the entire body from the beginning to the end. The movement trail of an entire body of each of the motion targets may be defined by the direction of the movement trail, the amplitude of the movement trail, etc. The amplitude of the movement trail may relate to a length of the movement trail. The movement intensity of an entire body of each of the motion targets may relate to a movement speed, a movement frequency, etc. For example, the greater of the movement speed of an entire body of each of the motion targets is, the greater the movement intensity of the entire body of each of the motion targets may be. As used herein, the movement frequency may refer to a frequency that the entire body of each of the motion targets performs a same action (e.g., jumping, moving back and forth, etc.). The higher the movement frequency of an entire body of each of the motion targets is, the greater the movement intensity of the entire body of each of the motion targets may be. The movement consistency between the motion targets may refer to a similarity between movement trails of the motion targets. The greater the similarity between movement trails of the motion targets, the greater the movement consistency between the motion targets may be. In some embodiments, the similarity between movement trails of the motion targets may refer to a similarity in the moving direction, a similarity in the moving speed, whether the moving trails intersect with each other, or a combination thereof. For example, the movement trails between the motion targets demonstrating running together in a same direction and same speed may have a higher similarity than that of the motion targets demonstrating running in a same direction yet in different speed (e.g., one chasing another). Therefore, the movement consistency between the motion targets demonstrating running together in a same direction and same speed may be higher than that of the motion targets demonstrating running in a same direction yet in different speed (e.g., one chasing another). As another example, the movement trails between the motion targets demonstrating intersection with each other may have a lower similarity than that of the motion targets demonstrating running in a same direction and same speed. Therefore, the movement consistency between the motion targets demonstrating intersection with each other may be higher than that of the motion targets demonstrating running in a same direction and same speed.

The local motion feature determination sub-unit 524 may determine a local motion feature (also referred to as a second motion feature as described in FIG. 1) relating to a portion of each entire body of motion targets. The portion of each entire body of the motion targets may include a hand, an arm, a finger, a thumb, a foot, an elbow, a knee, the head etc. In some embodiments, the local motion feature relating to the portion of each entire body of motion targets may include a movement trail of a portion of each entire body of motion targets, a movement velocity of the portion of each entire body of motion targets, a movement consistency between portions of entire bodies of motion targets, etc. The movement trail of the portion of each entire body of motion targets may refer to a spatial feature of the movement of the portion of each entire body of motion targets from the beginning to the end. The movement trail of a portion of each entire body of motion targets may be defined by the direction of the movement trail, the amplitude of the movement trail, etc. The amplitude of the movement trail may relate to a movement length of a portion of each entire body of motion targets relative to the each entire body of motion targets, a movement angle of a portion of each entire body of motion targets relative to the each entire body of motion targets, etc. The movement consistency between portions of entire bodies of motion targets may refer to a similarity between movement trails of portions of entire bodies of motion targets. The greater the similarity between movement trails of portions of entire bodies of motion targets, the greater the movement consistency between portions of entire bodies of motion targets may be. For example, the similarity of movement trails between the portions of entire bodies of motion targets being dancing together may be higher than that of the motion targets being fighting. The movement consistency between the portions of entire bodies of motion targets being dancing together may be higher than that of the portions of entire bodies of motion targets being fighting.

The surrounding motion feature determination sub-unit 526 may determine motion features of motion objects surrounding the motion targets. As used herein, the motion objects may be considered to surround the motion targets if the motion objects is within a specific range from the motion targets. For example, if the motion objects are within a pre-determined range from the motion targets, the motion objects may be considered to surround the motion targets. The motion features of the motion objects surrounding the motion targets may include a first motion feature relating to an entire body of each of the motion objects surrounding the motion targets (i.e., a global motion feature) and/or a second motion feature relating to a portion of each of the motion objects surrounding the motion targets (i.e., a local motion feature) as described above. In some embodiments, the motion features of the motion objects surrounding the motion targets may further include interacting motion features relating to the interactions between the motion targets and the motion objects surrounding them.

The historical feature determination sub-unit 528 may determine a historical statistic relating to an area where the motion targets are located and/or a time when the motion targets are located in the area. In some embodiments, the historical statistic may relate to an area where the motion targets are located. Further, the historical statistic relating to the area where the motion targets are located may include a frequency of one or more motion object occurring at the area where the motion targets located in history. In some embodiments, the historical statistic may relate to an area where the motion targets are located and a time when the motion targets are located in the area. Further, the historical statistic may include a frequency of one or more motion objects occurring at the area where the motion targets are located and at the time when the motion targets are located in the area. In some embodiments, the historical statistic relating to an area where the motion targets are located may include probabilities of a fighting occurring at the area, at the time, between the motion targets, or the combination thereof.

The event detector 540 may detect one or more events occurring between the one or more motion targets based on the motion features relating to motion targets determined by the feature determination unit 520. In some embodiments, the events may include an individual event relating to a single motion target and a group event relating to at least two motion targets. For example, the individual event relating to a single motion target may include dancing, greeting, exercise (e.g., running), robbing, steal, etc. The group event may include fighting, quarreling, gathering, collision, etc. In some embodiments, the events may include an abnormal event and a normal event occurring between the motion targets as described elsewhere in the present disclosure. For example, the abnormal event may include fighting, quarreling, robbing, gathering, collision, etc. The normal event may include dancing, greeting (e.g., handshake), exercise (e.g., running), playing a game, etc.

In some embodiments, the events occurring between the one or more motion targets may be defined by an area where the event occurs, a time when the event occurs, and/or motion features relating to the motion targets involved in the event. In some embodiments, the event detector 540 may detect the event via determining the area where the event occurs, the time when the event occurs, and/or the motion features relating to the motion targets involved in the event. The motion features relating to the motion targets involved in the events may include at least one of the global motion feature, the local motion feature, the surrounding motion feature, and the historical feature.

The fighting detector 560 may determine whether an event occurring between motion targets detected by the event detector 540 includes a fight based on the motion features relating to the motion targets determined by the feature determination unit 520.

In some embodiments, the fighting detector 560 may determine whether the event occurring between the motion targets includes a fight via comparing global motion features relating to the motion targets with a first criterion. If the global motion features relating to the motion targets satisfy with the first criterion, the fighting detector 560 may determine that the event occurring between the motion targets includes the fight. If the global motion features relating to the motion targets do not satisfy with the first criterion, the fighting detector 560 may determine that the event occurring between the motion targets does not include the fight. For example, if the fighting detector 560 determines that movement trails of entire bodies of the motion targets do not intersect, the fighting detector 560 may determine that the event occurring between the motion targets may not include a fight. If the fighting detector 560 determines that the movement trails of entire bodies of the motion targets intersect repeatedly which means that the motion targets approach each other and separate from each other repeatedly, the fighting detector 560 may determine that the event occurring between the motion targets may include a fight. As another example, if the fighting detector 560 determines that the movement intensities of entire bodies of the motion targets exceed a first threshold, the fighting detector 560 may determine that the event occurring between the motion targets may include a fight. As still an example, if the movement consistency between the motion targets is lower than a second threshold, the fighting detector 560 may determine that the event occurring between the motion targets may include a fight. For a further example, if the motion targets are running or dancing in a steady pace or pattern, the movement consistency between the motion targets may be higher than the second threshold, the fighting detector 560 may determine an event occurring between the motion targets does not include a fight.

In some embodiments, the fighting detector 560 may determine whether the event occurring between the motion targets includes a fight via comparing local motion features relating to the motion targets with a second criterion. If the local motion features relating to the motion targets satisfy with the second criterion, the fighting detector 560 may determine that the event occurring between the motion targets includes the fight. If the local motion features relating to the motion targets do not satisfy with the second criterion, the fighting detector 560 may determine that the event occurring between the motion targets does not include the fight. For example, if the fighting detector 560 determines that movement trails of portions of entire bodies of the motion targets do not intersect, the fighting detector 560 may determine that the event occurring between the motion targets may not include a fight. If the fighting detector 560 determines that the movement trails of portions of entire bodies of the motion targets intersect repeatedly which means that the motion targets approach each other and separate from each other repeatedly, the fighting detector 560 may determine that the event occurring between the motion targets may include a fight. As another example, if the fighting detector 560 determines that the movement velocities of portions of entire bodies of the motion targets exceed a third threshold, the fighting detector 560 may determine that the event occurring between the motion targets may include a fight. As still an example, if the movement consistency between the portions of entire bodies of the motion targets is lower than a fourth threshold, the fighting detector 560 may determine that the event occurring between the motion targets may include a fight. For a further example, if the motion targets are running or dancing in a steady pace or pattern, the movement consistency between portions of entire bodies of the motion targets may be higher than the fourth threshold, the fighting detector 560 may determine an event occurring between the motion targets does not include a fight.

In some embodiments, the fighting detector 560 may determine whether the event occurring between the motion targets includes a fight via comparing the global motion features relating to the motion targets with the first criterion, comparing the local features relating to the motion targets with the second criterion, and comparing surrounding motion features relating to the motion targets with a third criterion. If the global motion features relating to the motion targets satisfy with the first criterion, the local motion features relating to the motion targets satisfy with the second criterion, and/or the surrounding motion features relating to the motion targets satisfy with the third criterion, the fighting detector 560 may determine that the event occurring between the motion targets includes the fight. If the global motion features relating to the motion targets do not satisfy with the first criterion, the local motion features relating to the motion targets do not satisfy with the second criterion, and/or the surrounding motion features relating to the motion targets do not satisfy with a third criterion the fighting detector 560 may determine that the event occurring between the motion targets does not include the fight.

In some embodiments, the fighting detector 560 may determine whether an event occurring between the motion targets includes a fight based on the motion features relating to the motion targets. Further, the fighting detector 560 may assess the events with a pre-determined criterion. In some embodiments, the pre-determined criterion may include a pre-determined model relating to a fight. The fighting detector 560 may assess a motion feature vector with the pre-determined model relating to a fight to determine whether the event includes a fight. If the motion feature vector matches with the pre-determined model relating to a fight, the event relating to the motion targets may be considered to be as a fight. The motion feature vector may include at least one of the global motion feature, the local motion feature, the surrounding motion feature, and the historical feature. The pre-determined model relating to an abnormal event (e.g., a fighting) may be determined based a machine learning technique, such as a neural network algorithm.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure. For example, the feature determination unit 520 may further include a physiological signal feature determination sub-unit. The physiological signal feature determination sub-unit may determine a physiological signal feature relating to each of the motion targets. As another example, the fighting detector 560 may further determine whether the motion targets involve in a fight based on the physiological signal feature relating to each of the motion targets.

Figure 6:
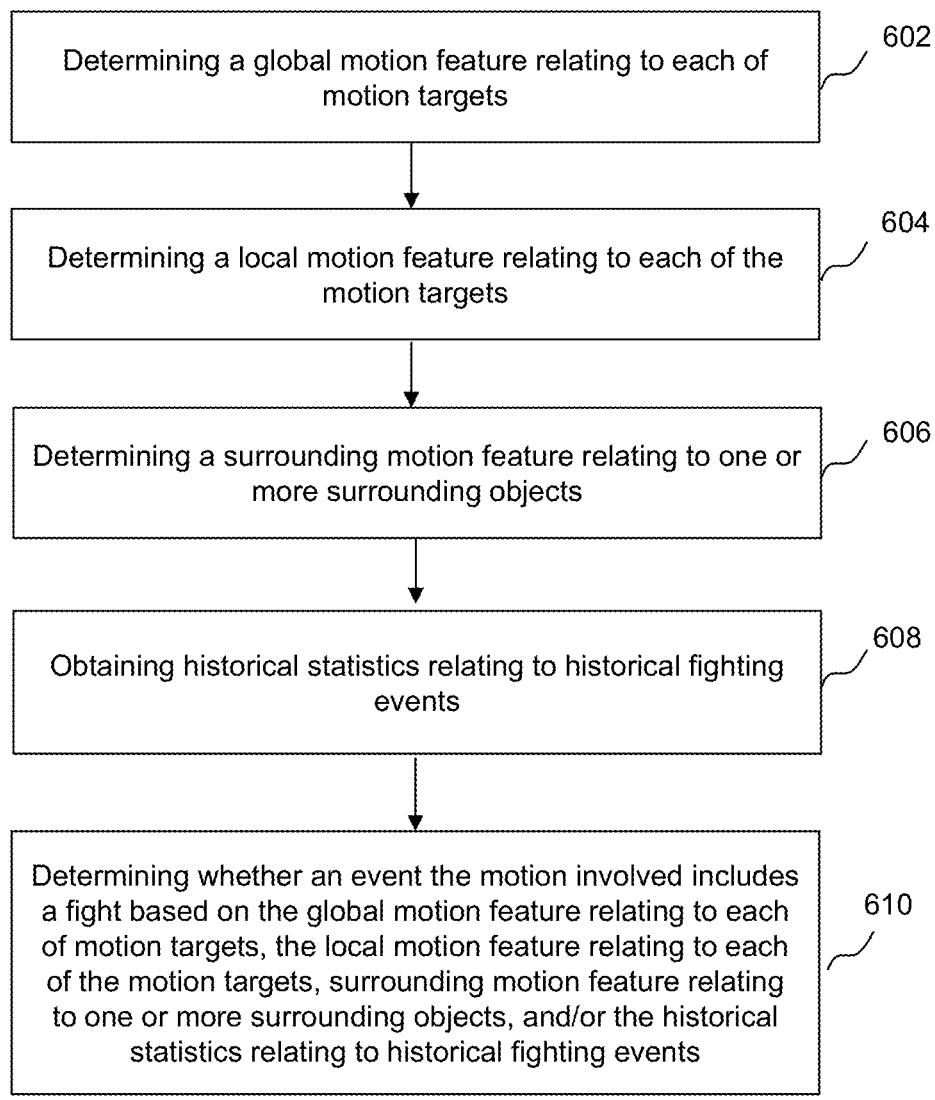
FIG. 6 is a flowchart illustrating an exemplary process for detecting motion objects according to some embodiments of the present disclosure.

FIG. 6 is a flowchart illustrating an exemplary process 600 for detecting motion objects according to some embodiments of the present disclosure. In some embodiments, one or more operations of process 400 illustrated in FIG. 4 may be implemented in the fighting assessment system 700 illustrated in FIG. 7. For example, the process 400 illustrated in FIG. 4 may be stored in the storage 780 in the form of instructions, and invoked and/or executed by the processing device 740 (e.g., the processor 810 of the computing device 800 as illustrated in FIG. 8, the GPU 930 or CPU 940 of the mobile device 900 as illustrated in FIG. 9).

In 602, a global motion features relating to each of motion targets may be determined. Operation 602 may be performed by the global feature determination unit 522. The global motion feature may be also referred to as a first motion feature as described elsewhere in the present disclosure. The global motion feature may relate to the movement of an entire body of each of the motion targets. The global motion feature relating to the entire body may include a movement trail of the entire body of each of the motion targets, a movement intensity of the entire body of each of the motion targets, a movement consistency between entire body movements of the motion targets, etc.

In 604, a local motion feature relating to each of the motion targets may be determined. Operation 604 may be performed by the local motion feature determination unit 524. The local motion feature may be also referred to as a second motion feature as described elsewhere in the present disclosure. The local motion feature may relate to the movement of a portion of an entire body of each of the motion targets. The local motion feature relating to a portion of an entire body of each of the motion targets may include a movement trail of a portion of an entire body of each of the motion targets, a movement velocity of a portion of an entire body of each of the motion targets, a movement consistency between the portions of entire bodies of the motion targets, etc.

In 606, a surrounding motion feature relating to one or more surrounding objects may be determined. Operation 606 may be performed by the surrounding motion feature determination unit 526. The surrounding motion feature relating to one or more surrounding objects may relate to the movement of a motion object surround the motion targets as described in FIG. 5. The surrounding motion feature relating to one or more surrounding objects may include a global motion feature relating to an entire body of each of the surrounding objects and a local motion feature relating to a portion of an entire body of each of the surrounding objects.

In 608, historical statistic relating to historical fighting events may be obtained. Operation 608 may be performed by the historical feature determination sub-unit 528. The historical fighting events may correspond to the same area and/or time in a day of an event the motion targets involved in a video scene. The event the motion targets involved in the video scene may be detected by the event detector 540 based on the global motion feature relating to each of motion targets, the local motion feature relating to each of the motion targets, and/or surrounding motion feature relating to one or more surrounding objects. The historical statistic relating to historical fighting events may include a historical frequency of the historical fighting events, a total number of the historical fighting events, etc.

In 610, a determination may be made to as whether an event the motion targets involved includes a fight based on the global motion feature relating to each of motion targets, the local motion feature relating to each of the motion targets, a surrounding motion feature relating to one or more surrounding objects, and/or the historical statistics relating to historical fighting events. Operation 608 may be performed by the fighting detector 560. The event may be detected by the event detector 540 as descried elsewhere in the present disclosure (e.g., FIG. 5 and the descriptions thereof). In some embodiments, the fighting detector 560 may determine whether the event occurring between the motion targets includes a fight via comparing the global motion feature relating to each of the motion targets with a first criterion, comparing the local feature relating to each of the motion targets with a second criterion, comparing a surrounding motion feature relating to one or more surrounding objects with a third criterion, and/or comparing the historical statistics relating to historical fighting events with a fourth criterion. If the global motion feature relating to each of the motion targets satisfies with the first criterion, the local motion feature relating to each of the motion targets satisfies with the second criterion, the surrounding motion feature relating to one or more surrounding objects satisfies with the third criterion, and/or the historical statistics relating to historical fighting events satisfies with the fourth criterion, the fighting detector 560 may determine that the event occurring between the motion targets includes the fight. If the global motion feature relating to each of the motion targets does not satisfy with the first criterion, the local motion feature relating to each of the motion targets des not satisfy with the second criterion, the surrounding motion feature relating to one or more surrounding objects does not satisfy with the third criterion, and/or the historical statistics relating to historical fighting events does not satisfy with the fourth criterion, the fighting detector 560 may determine that the event occurring between the motion targets does not include the fight. The first criterion, the second criterion, the third criterion, and/or the fourth criterion may be set by user or according to a default setting of the fighting assessment system 700.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure. For example, operations 602-604 may be performed simultaneously.

Figure 7:
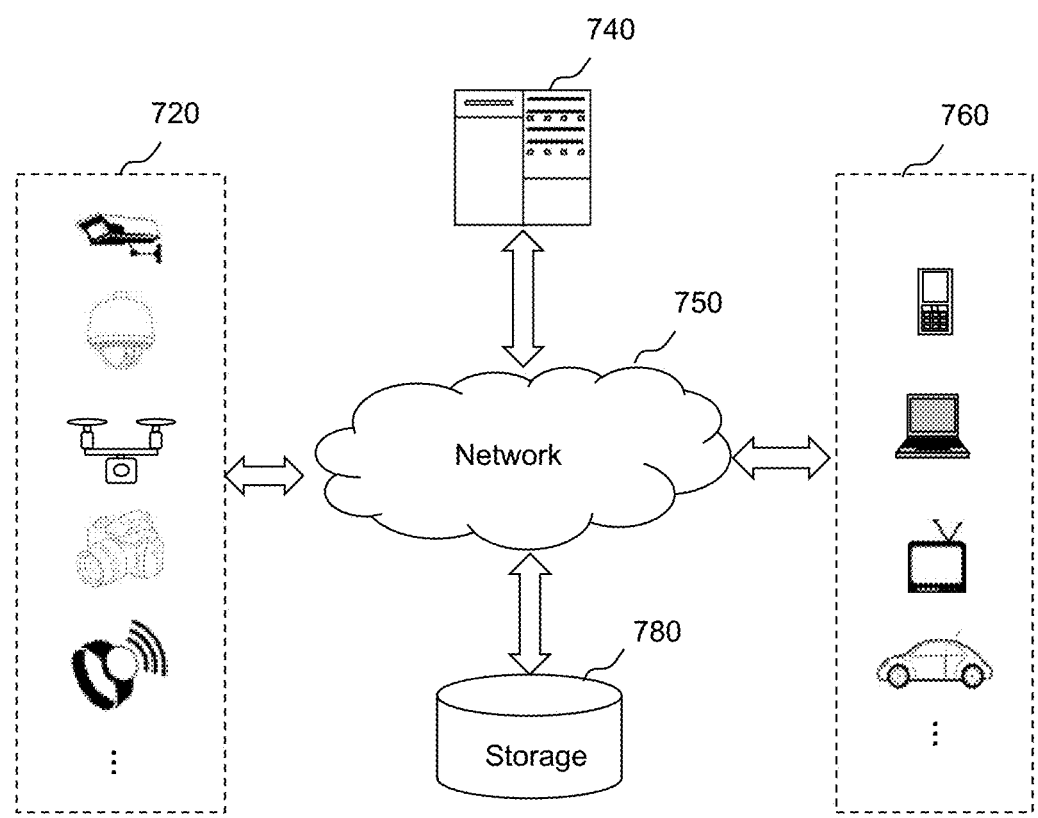
FIG. 7 is a schematic diagram illustrating an exemplary fighting assessment system according to some embodiments of the present disclosure.

FIG. 7 is a schematic diagram illustrating an exemplary fighting assessment system 700 according to some embodiments of the present disclosure. As shown, the fighting assessment system 700 may include a monitoring device 720, a processing engine 740, storage 780, one or more terminal(s) 760, and a network 750. In some embodiments, the monitoring device 720, the processing engine 740, the storage 780, and/or the terminal(s) 760 may be connected to and/or communicate with each other via a wireless connection (e.g., the network 750), a wired connection, or a combination thereof. The connection between the components in the fighting assessment system 700 may be variable. Merely by way of example, the monitoring device 720 may be connected to the processing engine 740 through the network 750, as illustrated in FIG. 7. As another example, the monitoring device 720 may be connected to the processing engine 740 directly. As a further example, the storage 780 may be connected to the processing engine 740 through the network 750, as illustrated in FIG. 7, or connected to the processing engine 740 directly. As still a further example, the terminal(s) 760 may be connected to the processing engine 740 through the network 750, as illustrated in FIG. 7, or connected to the processing engine 740 directly.

The monitoring device 720 may be positioned to perform surveillance of an area of interest (AOI) or an object of interest. In some embodiments, the AOI may be indoor or outdoor. For example, the AOI may include a room, a room in a jail, a shopping mall, a street, a park, a subway station, etc. The object may be organism or non-organism. For example, the object may include a person, a vehicle, an animal, a physical subject, or the like, or a combination thereof.

In some embodiments, the monitoring device 720 may include a video camera, a physiological signal measuring device, a wearable smart device, or the like, or a combination thereof. As used herein, a video camera may refer to an apparatus for visual recording. For example, the video camera may include a color camera, a digital video camera, a camera, a camcorder, a PC camera, a webcam, an infrared (IR) video camera, a low-light video camera, a thermal video camera, a CCTV camera, a pan, a tilt, a zoom (PTZ) camera, a video sensing device, or the like, or a combination thereof. The monitoring device 720 may include one or more video cameras that are installed in various places to monitor an area of interest. In some embodiments, the monitoring device 720 may include a camera embedded unmanned aerial vehicle (UAV). The physiological signal measuring device be configured to acquire a physiological signal of the object of interest. The physiological signal may include a photoplethysmogram (PPG) signal, an electrocardiogram (ECG) signal, an electroencephalogram (EEG) signal, an electromyogram (EMG) signal, or the like, or a combination thereof. The physiological signal measuring device may include an oscillometric device, a portable ECG monitor, a portable PPG monitor, or the like, or a combination thereof. The wearable smart device wearable devices include a pair of glasses, a shoulder strap, a smart watch, an anklet, a thigh band, an armband, a chest belt, a necklet, a finger clip, or the like, or a combination thereof. The above mentioned examples of monitoring device 720 are provided for illustration purposes, and not intended to limit the scope of the present disclosure. The monitoring device 720 may be in another form including, for example, a fingerstall, a wristband, a brassiere, an underwear, a chest band, or the like, or a combination thereof.

The processing engine 740 may process data and/or information obtained from the monitoring device 720, the storage 780, and/or the terminal(s) 760. For example, the processing engine 740 may determine whether at least two motion objects are involved in a fight based on data collected by the monitoring device 720. In some embodiments, the processing engine 740 may be a single server or a server group. The server group may be centralized or distributed. In some embodiments, the processing engine 740 may be local or remote. For example, the processing engine 740 may access information and/or data from the monitoring device 120, the storage 780, and/or the terminal(s) 760 via the network 750. As another example, the processing engine 740 may be directly connected to the monitoring device 120, the terminal(s) 760, and/or the storage 780 to access information and/or data. In some embodiments, the processing engine 740 may be implemented on a cloud platform. For example, the cloud platform may include a private cloud, a public cloud, a hybrid cloud, a community cloud, a distributed cloud, an inter-cloud, a multi-cloud, or the like, or a combination thereof. In some embodiments, the processing engine 740 may be implemented by a computing device 800 having one or more components as described in connection with FIG. 8.

The storage 780 may store data, instructions, and/or any other information. In some embodiments, the storage 780 may store data obtained from the processing engine 740, and the terminal(s) 760. In some embodiments, the storage 780 may store data and/or instructions that the processing engine 740 may execute or use to perform exemplary methods described in the present disclosure. In some embodiments, the storage 780 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 780 may be implemented on a cloud platform as described elsewhere in the disclosure.

In some embodiments, the storage 780 may be connected to the network 750 to communicate with one or more other components in the fighting assessment system 700 (e.g., the processing engine 740, the terminal(s) 760, etc.). One or more components in the fighting assessment system 700 may access the data or instructions stored in the storage 780 via the network 750. In some embodiments, the storage 780 may be part of the processing engine 740.

The terminal(s) 760 may be connected to and/or communicate with the monitoring device 720, the processing engine 740, and/or the storage 780. For example, the terminal(s) 760 may obtain a processed image from the processing engine 740. As another example, the terminal(s) 760 may obtain image data acquired via the monitoring device 720 and transmit the image data to the processing engine 740 to be processed. In some embodiments, the terminal(s) 760 may include a mobile device, a tablet computer, a laptop computer, or the like, or any combination thereof. For example, the mobile device may include a mobile phone, a personal digital assistance (PDA), a gaming device, a navigation device, a point of sale (POS) device, a laptop, a tablet computer, a desktop, or the like, or any combination thereof. In some embodiments, the terminal(s) 760 may include an input device, an output device, etc. The input device may include alphanumeric and other keys that may be input via a keyboard, a touch screen (for example, with haptics or tactile feedback), a speech input, an eye tracking input, a brain monitoring system, or any other comparable input mechanism. The input information received through the input device may be transmitted to the processing engine 740 via, for example, a bus, for further processing. Other types of the input device may include a cursor control device, such as a mouse, a trackball, or cursor direction keys, etc. The output device may include a display, a speaker, a printer, or the like, or a combination thereof. In some embodiments, the terminal(s) 760 may be part of the processing engine 740.

The network 750 may include any suitable network that can facilitate exchange of information and/or data for the fighting assessment system 700. In some embodiments, one or more components of the fighting assessment system 700 (e.g., the monitoring device 720, the processing engine 740, the storage 780, the terminal(s) 760, etc.) may communicate information and/or data with one or more other components of the fighting assessment system 700 via the network 750. For example, the processing engine 740 may obtain image data from the monitoring device 120 via the network 750. As another example, the processing engine 740 may obtain user instruction(s) from the terminal(s) 760 via the network 750. The network 750 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network (VPN), a satellite network, a telephone network, routers, hubs, witches, server computers, and/or any combination thereof. For example, the network 750 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 750 may include one or more network access points. For example, the network 750 may include wired and/or wireless network access points such as base stations and/or internet exchange points through which one or more components of the fighting assessment system 700 may be connected to the network 750 to exchange data and/or information.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the storage 780 may be a data storage including cloud computing platforms, such as, public cloud, private cloud, community, and hybrid clouds, etc. However, those variations and modifications do not depart the scope of the present disclosure.

FIG. 8 is a schematic diagram illustrating exemplary hardware and/or software components of an exemplary computing device 800 on which the processing engine 740 may be implemented according to some embodiments of the present disclosure. As illustrated in FIG. 8, the computing device 800 may include a processor 810, a storage 820, an input/output (I/O) 830, and a communication port 840.

The processor 810 may execute computer instructions (e.g., program code) and perform functions of the processing engine 740 in accordance with techniques described herein. The computer instructions may include, for example, routines, programs, objects, components, data structures, procedures, modules, and functions, which perform particular functions described herein. For example, the processor 810 may process image data obtained from the monitoring device 720, the storage 780, terminal(s) 760, and/or any other component of the fighting assessment system 700. In some embodiments, the processor 810 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or a combinations thereof.

Merely for illustration, only one processor is described in the computing device 800. However, it should be noted that the computing device 800 in the present disclosure may also include multiple processors, thus operations and/or method steps that are performed by one processor as described in the present disclosure may also be jointly or separately performed by the multiple processors. For example, if in the present disclosure the processor of the computing device 800 executes both operation A and operation B, it should be understood that operation A and operation B may also be performed by two or more different processors jointly or separately in the computing device 800 (e.g., a first processor executes operation A and a second processor executes operation B, or the first and second processors jointly execute operations A and B).

The storage 820 may store data/information obtained from the monitoring device 720, the storage 780, the terminal(s) 760, and/or any other component of the fighting assessment system 700. In some embodiments, the storage 820 may include a mass storage, a removable storage, a volatile read-and-write memory, a read-only memory (ROM), or the like, or a combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 320 may store one or more programs and/or instructions to perform exemplary methods described in the present disclosure. For example, the storage 820 may store a program for the processing engine 740 for determining a target flip angle schedule.

The I/O 830 may input and/or output signals, data, information, etc. In some embodiments, the I/O 830 may enable a user interaction with the processing engine 740. In some embodiments, the I/O 830 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 840 may be connected to a network (e.g., the network 720) to facilitate data communications. The communication port 840 may establish connections between the processing engine 740 and the monitoring device 720, the storage 780, and/or the terminal(s) 760. The connection may be a wired connection, a wireless connection, any other communication connection that can enable data transmission and/or reception, and/or a combination of these connections. The wired connection may include, for example, an electrical cable, an optical cable, a telephone wire, or the like, or a combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or a combination thereof. In some embodiments, the communication port 840 may be and/or include a standardized communication port, such as RS232, RS485, etc. In some embodiments, the communication port 840 may be a specially designed communication port. For example, the communication port 840 may be designed in accordance with the digital imaging and communications in medicine (DICOM) protocol.

FIG. 9 is a schematic diagram illustrating exemplary hardware and/or software components of an exemplary mobile device 900 on which the terminal(s) 760 may be implemented according to some embodiments of the present disclosure. As illustrated in FIG. 9, the mobile device 900 may include a communication platform 910, a display 920, a graphic processing unit (GPU) 930, a central processing unit (CPU) 940, an I/O 950, a memory 960, and a storage 970. In some embodiments, any other suitable component, including but not limited to a system bus or a controller (not shown), may also be included in the mobile device 900. In some embodiments, a mobile operating system 980 (e.g., iOS™, Android™, Windows Phone™, etc.) and one or more applications 990 may be loaded into the memory 960 from the storage 990 in order to be executed by the CPU 940. The applications 980 may include a browser or any other suitable mobile apps for receiving and rendering information relating to image processing or other information from the processing engine 740. User interactions with the information stream may be achieved via the I/O 950 and provided to the processing engine 740 and/or other components of the fighting assessment system 700 via the network 750.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

I claim:

1. A system, comprising:
   a computer-readable storage medium storing executable instructions for detecting abnormal scene; and
   at least one processor in communication with the computer-readable storage medium, when executing the executable instructions, the at least one processor is directed to:
   obtain data relating to a video scene;
   identify at least two motion objects and at least one surrounding object in the video scene based on the data and one or more motion object detection algorithms, wherein the at least one surrounding object is within a pre-determined range from the at least two motion objects, the one or more motion object detection algorithms include an inter-frame difference algorithm, a background difference algorithm, or an optical flow algorithm;
   determine a first motion feature relating to the at least two motion objects based on the data;
   determine a second motion feature relating to at least one portion of each of the at least two motion objects based on the data, the portion of each of the at least two motion objects includes a hand, an arm, a finger, a thumb, a foot, an elbow, a knee or a head;
   determine a third motion feature relating to the at least one surrounding object in the video scene;
   determine a historical statistic relating to historical fighting events, each of the historical fighting events referring to a fighting event that occurred in a day in history at a same area as the video scene and that the at least two motion objects were involved in; and
   determine whether the at least two motion objects in the video scene are involved in a fight by accessing a motion feature vector using a pre-determined model, the motion feature vector including the first motion feature, the second motion feature, the third motion feature, and the historical statistic, the pre-determined model being determined using a machine learning technique.

2. The system of claim 1, wherein the at least one processor is further directed to:
   track movements of the at least two motion objects in the video scene.

3. The system of claim 2, wherein to track movements of the at least two motion objects in the video scene, the at least one processor is further directed to:
   track an entire body movement of each of the at least two motion objects in the video scene; and
   track a movement of at least one portion of each of the at least two motion objects in the video scene.

4. The system of claim 1, wherein the first motion feature relating to the at least two motion objects includes at least one of:
   movement trails of the at least two motion objects,
   motion intensities of the at least two motion objects, or
   motion consistencies of the at least two motion objects.

5. The system of claim 1, wherein the second motion feature relating to at least one portion of each of the at least two motion objects includes at least one of:
   a movement trail of the at least one portion of each of the at least two motion objects,
   a motion consistency of the at least one portion of each of the at least two motion objects, or
   a motion velocity of the at least one portion of each of the at least two motion objects.

6. The system of claim 1, wherein the third motion feature include a global motion feature relating to an entire body of each of the at least one surrounding object and a local motion feature relating to a portion of an entire body of each of the at least one surrounding object.

7. The system of claim 1, wherein to determine whether the at least two motion objects are involved in a fight based on the first motion feature, the second motion feature, and the third motion feature, the at least one processor is further directed to:
   compare the first motion feature with a first criterion;
   compare the second motion feature with a second criterion;
   compare the third motion feature with a third criterion; and
   determine whether the at least two motion objects are involved in the fight based on the comparison of the first motion feature with the first criterion, the comparison of the second motion feature with the second criterion, and the comparison of the third motion feature with the third criterion.

8. The system of claim 1, the at least one processor is further directed to:
   determine whether the at least two motion objects are involved in the fight based on at least one of physiological signals relating to the at least two motion objects.

9. A method implemented on a computing device having at least one processor and at least one computer-readable storage medium for abnormal scene detection, the method comprising:
   obtaining data relating to a video scene;
   identifying at least two motion objects and at least one surrounding object in the video scene based on the data and one or more motion object detection algorithms, wherein the at least one surrounding object is within a pre-determined range from the at least two motion objects, the one or more motion object detection algorithms include an inter-frame difference algorithm, a background difference algorithm, or an optical flow algorithm;
   determining a first motion feature relating to the at least two motion objects based on the data;
   determining a second motion feature relating to at least one portion of each of the at least two motion objects based on the data, the portion of each of the at least two motion objects includes a hand, an arm, a finger, a thumb, a foot, an elbow, a knee or a head;

determining a third motion feature relating to the at least one surrounding object in the video scene;

determining a historical statistic relating to historical fighting events, each of the historical fighting events referring to a fighting event that occurred in a day in history at a same area as the video scene and that the at least two motion objects were involved in; and determine whether the at least two motion objects in the video scene are involved in a fight by accessing a motion feature vector using a pre-determined model, the motion feature vector including the first motion feature, the second motion feature, the third motion feature, and the historical statistic, the pre-determined model being determined using a machine learning technique.

10. The method of claim 9, further comprising:
tracking movements of the at least two motion objects in the video scene.

11. The method of claim 10, wherein the tracking movements of the at least two motion objects in the video scene further includes:
tracking an entire body movement of each of the at least two motion objects in the video scene; and
tracking a movement of at least one portion of each of the at least two motion objects in the video scene.

12. The method of claim 9, wherein the first motion feature relating to the at least two motion objects includes at least one of:
movement trails of the at least two motion objects,
motion intensities of the at least two motion objects, or
motion consistencies of the at least two motion objects.

13. The method of claim 9, wherein the second motion feature relating to at least one portion of each of the at least two motion objects includes at least one of:
a movement trail of the at least one portion of each of the at least two motion objects,
a motion consistency of the at least one portion of each of the at least two motion objects, or
a motion velocity of the at least one portion of each of the at least two motion objects.

14. The method of claim 9, wherein the third motion feature include a global motion feature relating to an entire body of each of the at least one surrounding object and a local motion feature relating to a portion of an entire body of each of the at least one surrounding object.

15. The method of claim 9, wherein the determining whether the at least two motion objects are involved in a fight based on the first motion feature, the second motion feature, and the third motion feature includes:
comparing the first motion feature with a first criterion;
comparing the second motion feature with a second criterion;
comparing the third motion feature with a third criterion; and
determining whether the at least two motion objects are involved in the fight based on the comparison of the first motion feature with the first criterion, the comparison of the second motion feature with the second criterion, and the comparison of the third motion feature with the third criterion.

16. The method of claim 9, further comprising:
determining whether the at least two motion objects are involved in the fight based on at least one of physiological signals relating to the at least two motion objects.

17. A non-transitory computer readable medium, comprising:
instructions being executed by at least one processor, causing the at least one processor to implement a method, comprising:
obtaining data relating to a video scene;
identifying at least two motion objects and at least one surrounding object in the video scene based on the data and one or more motion object detection algorithms, wherein the at least one surrounding object is within a pre-determined range from the at least two motion objects, the one or more motion object detection algorithms include an inter-frame difference algorithm, a background difference algorithm, or an optical flow algorithm;
determining a first motion feature relating to the at least two motion objects based on the data;
determining a second motion feature relating to at least one portion of each of the at least two motion objects based on the data, the portion of each of the at least two motion objects includes a hand, an arm, a finger, a thumb, a foot, an elbow, a knee or a head;
determining a third motion feature relating to the at least one surrounding object in the video scene;
determining a historical statistic relating to historical fighting events, each of the historical fighting events referring to a fighting event that occurred in a day in history at a same area as the video scene and that the at least two motion objects were involved in; and
determining whether the at least two motion objects in the video scene are involved in a fight by accessing a motion feature vector using a pre-determined model, the motion feature vector including the first motion feature, the second motion feature, the third motion feature, and the historical statistic, the pre-determined model being determined using a machine learning technique.

18. The non-transitory computer readable medium of claim 17, wherein the first motion feature relating to the at least two motion objects includes at least one of:
movement trails of the at least two motion objects,
motion intensities of the at least two motion objects, or
motion consistencies of the at least two motion objects.

19. The non-transitory computer readable medium of claim 17, wherein the second motion feature relating to at least one portion of each of the at least two motion objects includes at least one of:
a movement trail of the at least one portion of each of the at least two motion objects,
a motion consistency of the at least one portion of each of the at least two motion objects, or
a motion velocity of the at least one portion of each of the at least two motion objects.

* * * * *